No. 826,560. PATENTED JULY 24, 1906.
M. GARANGER.
LOOP THE GAP APPARATUS.
APPLICATION FILED DEC. 5, 1905.

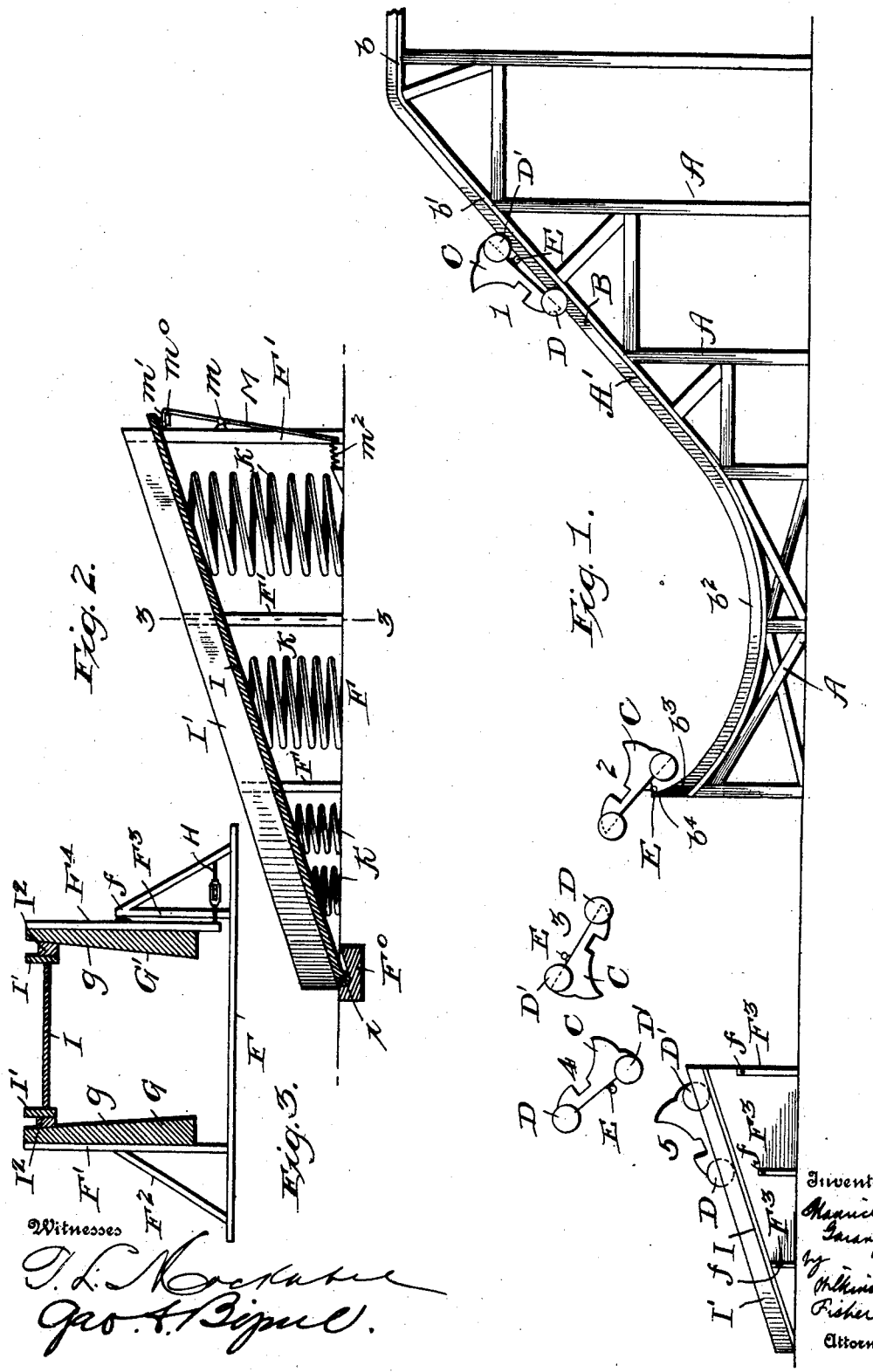

2 SHEETS—SHEET 2.

Inventor
Maurice Garanger,
By Wilkinson & Fisher,
Attorneys

Witnesses

UNITED STATES PATENT OFFICE.

MAURICE GARANGER, OF NEW YORK, N. Y.

LOOP-THE-GAP APPARATUS.

No. 826,560.      Specification of Letters Patent.      Patented July 24, 1906.

Application filed December 5, 1905. Serial No. 290,403.

*To all whom it may concern:*

Be it known that I, MAURICE GARANGER, a citizen of the Republic of France, residing at New York, in the county of New York and State of New York, have invented certain new and useful Improvements in Loop-the-Gap Apparatus; and I do hereby declare the following to be a full, clear, and exact description of the invention, such as will enable others skilled in the art to which it appertains to make and use the same.

My invention relates to what is known as "loop-the-gap" apparatus; and it is intended to provide an apparatus in which a vehicle is caused to run down an inclined track with great velocity and is subsequently caused to perform one or more complete revolutions lengthwise, crossing a gap in the track, and finally running safely down a second section of the track separate from the first.

My invention will be understood by reference to the accompanying drawings, in which—

Figure 4:
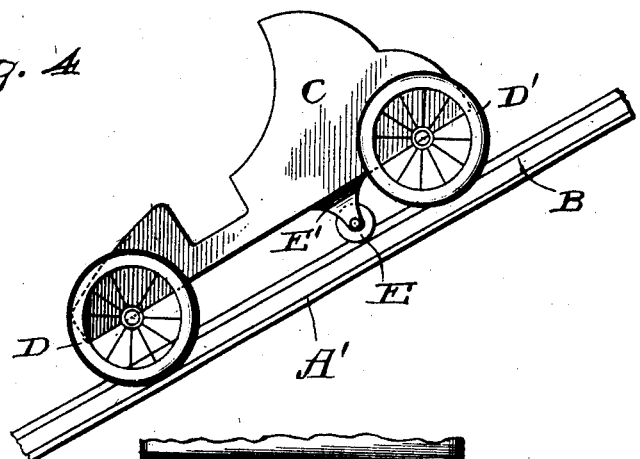
Figure 5:
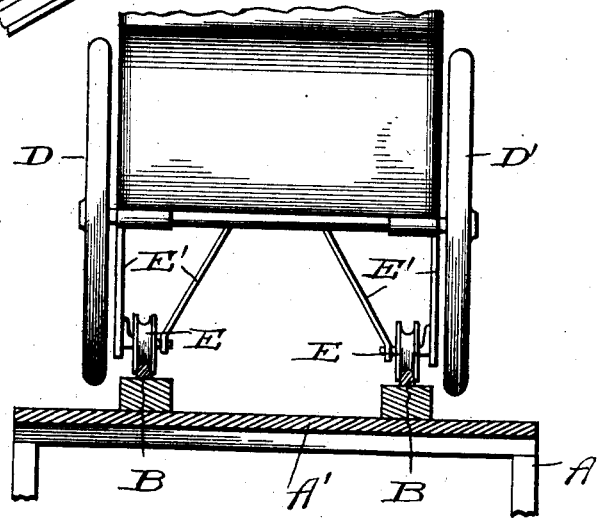

Figure 1 is a side elevation of the track complete and shows the vehicle in five different positions. Fig. 2 shows a central longitudinal section through the detached section of the track, parts being shown in elevation and the device being shown on a larger scale than in Fig. 1. Fig. 3 shows a section along the line 3 3 of Fig. 2 and on a still larger scale. Fig. 4 is a side elevation of the vehicle running down the track. Fig. 5 is a section through the track and shows a rear end view of the vehicle on a larger scale than in the preceding figures; and Fig. 6 shows a modification in the construction of the detached section of the track, parts being shown in central vertical section.

Referring first to Figs. 1 to 5, A represents any suitable framework carrying a platform A', supporting the track B. This track is preferably horizontal, as at $b$, to allow the car to rest until ready for its descent. The track is then inclined sharply downward, as at $b'$, curved, as at $b^2$, and slopes upward, as at $b^3$, terminating in a horn $b^4$. This track supports the auxiliary wheels on the vehicle, as will be hereinafter described, and the horn strikes these wheels, causing the vehicle to perform a somersault lengthwise. The downward and upward curves of the platform and the tracks supporting the auxiliary wheels are set at the required angles, which are determined by calculation supplemented by experiment. C represents the vehicle provided with the ordinary wheels D and D', having pneumatic or elastic tires; but when in use on the first segment of the track one pair of the ordinary wheels, such as the front wheels D, engage the platform, while there are auxiliary wheels E, journaled on hangers E', which ride up on the tracks B and keep the other pair of wheels, such as the rear wheels, clear of the track. In practice it will be possible to arrange the vehicle so that either the front or rear wheels may be free from the platform; but I have shown in the drawings the rear wheels as lifted clear of the platform A' and the front wheels D resting on said platform. Beyond the horn $b^4$ is a gap, and beyond this gap is a second platform I, which is downwardly inclined, as shown, and is pivoted, as at $i$, to the cross-piece $F^0$ of the frame F. This platform has guard-rails I' at either side and is supported by springs K, as shown in Fig. 2, or by any other suitable spring arrangement, such as that shown in Fig. 6, hereinafter to be described. This platform yields downward against the action of these springs when struck by the vehicle, and thus lessens the jar of the vehicle after it has crossed the gap. The platform is held down against the upper pressure of the springs, so as to give the springs an initial compression by any suitable means—as, for instance, by the rod M, which has an arm $m'$, engaging in the eye $m^0$, fast to the bottom of the platform. This rod is pivoted, as at $m$, and to its lower end is connected a spring $m^2$, which tends to swing the arm $m'$ out of engagement with the eye $m^0$, as soon as the platform is pressed down slightly, as when the car strikes the same. The frame F is provided with side plates or bars F' with braces $F^2$, and on the opposite side there are similar side plates or bars $F^4$, pivoted, as at $f$, to the part $F^3$ of the frame F. Fast to these plates or bars F' and $F^4$ are the wooden braking-pieces G, having wedge-faces $g$. To the side of the platform I brake-shoes $I^2$ are attached, which engage these wedge-faces, as shown in Fig. 3. The angle between the opposite wedge-faces $g$ may be adjusted by means of the turnbuckle H.

Figure 6:
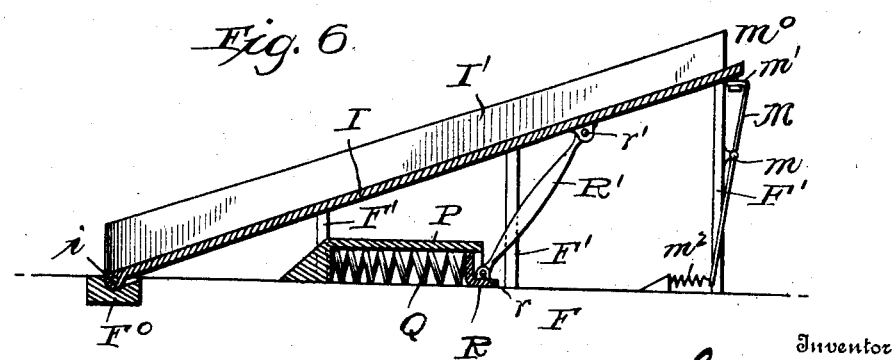

In the form of device shown in Fig. 6 the parts are generally the same as in Fig. 2, except that a holder P is provided for the spring Q, which holder is fast to the platform F, and the spring Q is compressed by the follower R, which is connected to the bottom of the platform I by means of the connecting-rod R', the said connecting-rod being pivoted to the follower, as at r, and to the under side of the platform, as at r'. There may be any number of these springs Q and rods R'.

The ordinary operation of the apparatus will be as follows: Suppose the brake-pieces G and G' to be set so as to cause the shoes I² to engage after the platform has been pressed down slightly, as by the falling thereon of the car after it has completed its travel across the gap, and suppose the car to be in the position shown at the numeral 1 in Fig. 1. The car will run down the platform A' until it reaches the position 2, when it will begin to turn a somersault, assuming the positions 3 and 4, and finally landing on the platform I in the position 5 and running down the same. When the car strikes this platform I, it will press the springs down, wedging the shoes I² against the wedge-faces g, and thus gradually breaking the downward descent of the free end of the platform and allowing the car to run down, as indicated. As the platform yields the rod M will be thrown out of engagement; but the engagement of the brake-shoes I² with the wedge-faces g will hold the platform in its down-pressed position. By easing up on the turnbuckle H the friction on the brake-shoes may be relieved, and the springs K will then throw the platform upward about its pivot, and it may be hauled down again by hand or in any convenient way and hooked by the rod M, as before. Any convenient means for holding the platform down in the initial position may be adopted.

The apparatus shown in Fig. 6 operates in precisely the same way as that shown in Figs. 2 and 3.

With the apparatus as just described the car will perform a single somersault in crossing the gap. Now, however, if it its desired to perform a second somersault after it strikes the platform I this may be accomplished by having the platform I held down with such force as to strongly compress the springs and at the same time ease up upon the turnbuckle H so much that the brake-shoes I² will have no braking effect during the slight downward depression of the free end of the platform. Now having the springs under heavy compression, as stated, suppose the car after having performed its somersault in crossing the gap strikes the upper end of the platform, owing to the inertia of the falling car, it will depress the upper end of the platform, slightly releasing the rod M from engagement with the eye m⁰, and as the inertia of the falling car is overcome by the springs the springs will rebound, throwing the car upward and causing it to execute a second somersault above the platform I, after which the car will run down the platform, as before. Thus it will be seen that with the herein-described apparatus the car may be caused to turn either a single somersault in crossing the gap or in addition a second somersault after it reaches the platform I. Ordinarily this latter somersault would not be required; but where it is intended to be accomplished as a regular part of the performance the brake-shoes I² and the brake-pieces G and G' may be omitted, thus allowing the platform to swing up and down without any other braking effect than that of the springs beneath the same.

It will be noted that the platform I will be more or less resilient and the tires of the wheels of the car will be elastic, and where it is not desired to have the double somersault the springs beneath the platform may be omitted, as illustrated in Fig. 3, the checking effect of the brake-shoes and brake-pieces being in that case sufficient to ease the shock of impact of the car after it crosses the gap.

It will be obvious that various modifications may be made in the herein-described apparatus which could be used without departing from the spirit of my invention.

Having thus described my invention, what I claim, and desire to secure by Letters Patent of the United States, is—

1. The combination with a four-wheeled vehicle provided with auxiliary wheels, of a downwardly-inclined rigid platform curved upward at its lower end, means carried by said platform for engaging said auxiliary wheels and causing the vehicle to turn a somersault after leaving said platform, and a spring-platform spaced apart from the first and in the same vertical plane therewith, and adapted to receive said vehicle after it has crossed said gap, substantially as described.

2. The combination with a four-wheeled vehicle provided with auxiliary wheels, of a downwardly-inclined platform curved upward at its lower end, means carried by said platform for engaging said auxiliary wheels and causing said vehicle to turn a somersault after leaving said platform, and a second platform downwardly inclined and pivoted at its lower end and spaced apart from the first platform and in the same vertical plane therewith, with springs located beneath said platform, substantially as and for the purposes described.

3. The combination with a four-wheeled vehicle provided with auxiliary wheels, of a downwardly-inclined platform curved upward at its lower end, means carried by said platform for engaging said auxiliary wheels and causing said vehicle to turn a somersault after leaving said platform, and a second platform downwardly inclined and pivoted at its lower end and spaced apart from the first platform and in the same vertical plane therewith, with springs located beneath said platform, with brakes acting in conjunction with said springs to retard the downward thrust on said platform, substantially as described.

4. The combination with a four-wheeled vehicle provided with auxiliary wheels, of a downwardly-inclined platform curved upward at its lower end, means carried by said platform for engaging said auxiliary wheels and causing said vehicle to turn a somersault after leaving said platform, and a second platform downwardly inclined and pivoted at its lower end and spaced apart from the first platform and in the same vertical plane therewith, with springs located beneath said platform, with detachable means for holding down the free end of said platform, substantially as described.

5. The combination with a four-wheeled vehicle provided with auxiliary wheels, of a downwardly-inclined platform curved upward at its lower end, means carried by said platform for engaging said auxiliary wheels and causing said vehicle to turn a somersault after leaving said platform, and a second platform downwardly inclined and pivoted at its lower end and spaced apart from the first platform and in the same vertical plane therewith, with springs located beneath said platform, and a spring-impressed rod normally holding the free end of said platform down against the action of said spring, but releasing same when the free end of said platform is slightly depressed, substantially as described 6. The combination with a four-wheeled vehicle provided with auxiliary wheels, of a downwardly-inclined rigid platform curved upward at its lower end, a track provided with an upwardly-curved end carried by said platform for engaging said auxiliary wheels and causing the vehicle to turn a somersault after leaving said platform, and a spring-platform spaced apart from the first and in the same vertical plane therewith, and adapted to receive said vehicle after it has crossed said gap, substantially as described.

7. The combination with a four-wheeled vehicle provided with auxiliary wheels, of a downwardly-inclined platform curved upward at its lower end, a track provided with an upwardly-curved end carried by said platform for engaging said auxiliary wheels and causing said vehicle to turn a somersault after leaving said platform, and a second platform downwardly inclined and pivoted at its lower end and spaced apart from the first platform and in the same vertical plane therewith, with springs located beneath said platform, and means for limiting the upward movement of said platform, substantially as and for the purposes described.

8. The combination with a wheeled vehicle, of a downwardly-inclined rigid platform curved upward at its lower end, means carried by said platform for engaging said vehicle and causing it to turn a somersault after leaving said platform, and a spring-platform spaced apart from the first and in the same vertical plane therewith, and adapted to receive said vehicle after it has crossed the gap, substantially as described.

9. The combination with a wheeled vehicle, of a downwardly-inclined platform curved upward at its lower end, means carried by said platform for engaging said vehicle and causing said vehicle to turn a somersault after leaving said platform, and a second platform downwardly inclined and pivoted at its lower end and spaced apart from the first platform and in the same vertical plane therewith, with springs located beneath said platform, substantially as and for the purposes described.

In testimony whereof I affix my signature in presence of two witnesses.

MAURICE GARANGER.

Witnesses:
ANDRÉ LESOURD,
FRANK GIBBONS.